United States Patent
He et al.

(10) Patent No.: US 6,993,098 B2
(45) Date of Patent: Jan. 31, 2006

(54) METHOD AND APPARATUS FOR EFFICIENT CALCULATING DISTANCE METRIC

(75) Inventors: Allen He, Fremont, CA (US); Andrew Prentice, Pleasanton, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 705 days.

(21) Appl. No.: 09/904,355

(22) Filed: Jul. 12, 2001

(65) Prior Publication Data

US 2003/0053566 A1    Mar. 20, 2003

(51) Int. Cl.
H04L 27/06    (2006.01)

(52) U.S. Cl. .................. 375/340; 375/262; 375/341; 714/794

(58) Field of Classification Search .............. 375/262, 375/265, 341, 340; 714/786, 792, 794, 795
See application file for complete search history.

(56) References Cited

U.S. PATENT DOCUMENTS

| | | | |
|---|---|---|---|
| 6,594,318 B1 * | 7/2003 | Sindhushayana | 375/262 |
| 6,807,238 B1 * | 10/2004 | Rhee et al. | 375/340 |
| 2002/0067777 A1 * | 6/2002 | Jeong | 375/324 |

FOREIGN PATENT DOCUMENTS

| | | | |
|---|---|---|---|
| GB | 2388756 A | * | 11/2003 |
| WO | WO 0167617 A | | 9/2001 |

* cited by examiner

*Primary Examiner*—Chieh M. Fan
(74) *Attorney, Agent, or Firm*—Aaron Waxler

(57) ABSTRACT

A method and an apparatus for determining the log-likelihood ratio of a received signal. The log-likelihood ratio is determined by calculating distance between the received symbol and closest constellation point matching a bit and the distance between the received symbol and the closest constellation point not matching the bit.

6 Claims, 4 Drawing Sheets

METHOD AND APPARATUS FOR EFFICIENT CALCULATING DISTANCE METRIC

TECHNICAL FIELD

The invention relates generally to communications systems and, more particularly, to a method and an apparatus for determining a blind gain ratio.

BACKGROUND

Digital networks generally involve the modulation of a digital message on a transmitted signal. Typically, digital messages are encoded prior to modulation and transmission, and decoded upon reception and de-modulation. The encoded digital messages are generally grouped into one or more bits forming a symbol. The symbol is used to select a high-frequency, sinusoidal electromagnetic (EM) wave that has been identified as representing the symbol. The technique generally used to transmit a symbol by a high frequency sinusoidal EM wave is to alter the wave's amplitude, frequency, and/or phase in a designated manner. Therefore, an EM wave comprising a predetermined amplitude, frequency, and/or phase represents a symbol, i.e., a predetermined bit pattern.

Upon reception, the EM wave is demodulated and decoded to determine the digital message. Generally, particularly in the use of a turbo decoder in a system utilizing Quadrature Amplitude Modulation (QAM), a demodulator generates a soft output of the log likelihood that a particular bit is a one or a zero. The turbo decoder uses the log likelihood as input to the turbo decoder algorithm. The log likelihood, however, is a time-consuming and processing-intensive calculation that generally involves multiple comparators and multipliers Therefore, there is a need for a method and an apparatus for determining the log likelihood ratio that a bit in a received digital message is a one verses that it is a zero.

SUMMARY

The present invention provides a method and an apparatus for determining the log-likelihood ratio by calculating distance between the received symbol and the closest constellation point matching a bit and the distance between the received symbol and the closest constellation point not matching the bit.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning telecommunications and the like have been omitted inasmuch as such details are not considered necessary to obtain a complete understanding of the present invention, and are considered to be within the skills of persons of ordinary skill in the relevant art.

It is further noted that, unless indicated otherwise, all functions described herein may be performed in either hardware or software, or some combination thereof. In a preferred embodiment, however, the functions are implemented in hardware in order to provide the most efficient implementation. Alternatively, the functions may be performed by a processor such as a computer or an electronic data processor in accordance with code such as computer program code, software, and/or integrated circuits that are coded to perform such functions, unless indicated otherwise.

The principles of the present invention and their advantages are best understood by referring to the illustrated embodiment depicted in FIGS. 1–4.

Figure 1:
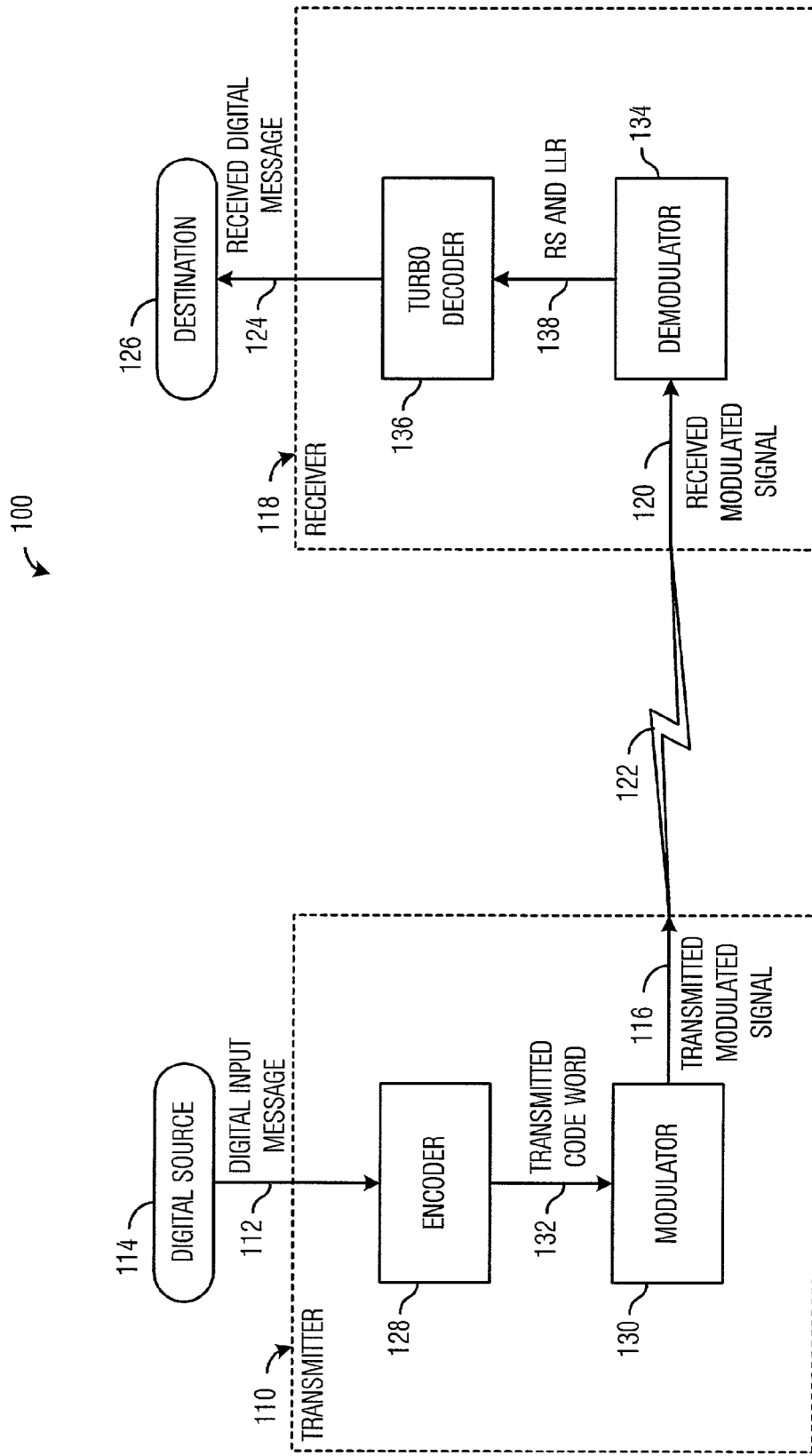
FIG. 1 is a schematic diagram of a network environment that embodies features of the present invention.

Referring to FIG. 1 of the drawings, the reference numeral 100 generally designates a portion of a communications network, which embodies features of the present invention. Specifically, the communications portion 100 comprises a transmitter 110 connected to a digital source 114 and configured to accept the digital input message 112 from the digital source 114, and to generate and transmit a transmitted modulated signal 116. Additionally, the communications portion 100 comprises a receiver 118 configured to accept as a received modulated signal 120 the transmitted modulated signal 116 transmitted via EM waves 122, and to forward a received digital message 124 to a destination 126. Generally, as is known in the art, the transmission of the transmitted modulated signal 116 via the EM waves 122 introduces noise, such as path-loss fading and multi-path fading, electromagnetic noise, and the like, into the transmitted signal, and, therefore, the received modulated signal 120 differs from the transmitted modulated signal 116.

The transmitter 110 generally comprises an encoder 128 interconnected with a modulator 130. The encoder 128 is configured to accept the digital input message 112 and to provide a transmitted code word 132 to the modulator 130. The modulator 130 is preferably a digital modulator, such as a Quadrature Amplitude Modulator (QAM), configured to convert the transmitted code word 132 into a transmitted modulated signal 116, which may be transmitted via the EM waves 122 via wireless or wireline technologies, thereby providing the received modulated signal 120. The transmission of signals via wireless or wireline technologies is well known in the art and, therefore, will not be discussed in greater detail, except insofar as is necessary to describe the present invention.

The receiver 118 comprises a demodulator 134 interconnected with a turbo decoder 136. The demodulator 134 is configured to accept the received modulated signal 120 and to generate a received symbol (RS) and the log likelihood ratio (LLR) for each bit in the received symbol 138.

The turbo decoder 136 is configured to accept the received symbol and the LLR 138, and to provide the destination 126 with the received digital message 124. The process of accepting the received symbol and the LLR 138 and providing the destination 126 with the received digital message 124 is considered well-known to one of ordinary skill in the art and, therefore, will not be discussed in greater detail.

The remaining disclosure is presented in terms of a system utilizing 16-QAM techniques for exemplary purposes only, and should not be interpreted as limiting the scope of the present invention applies equally to any M-ary QAM application, the application of which will be obvious to one of ordinary skill in the art upon a reading of the present invention.

Figure 2:
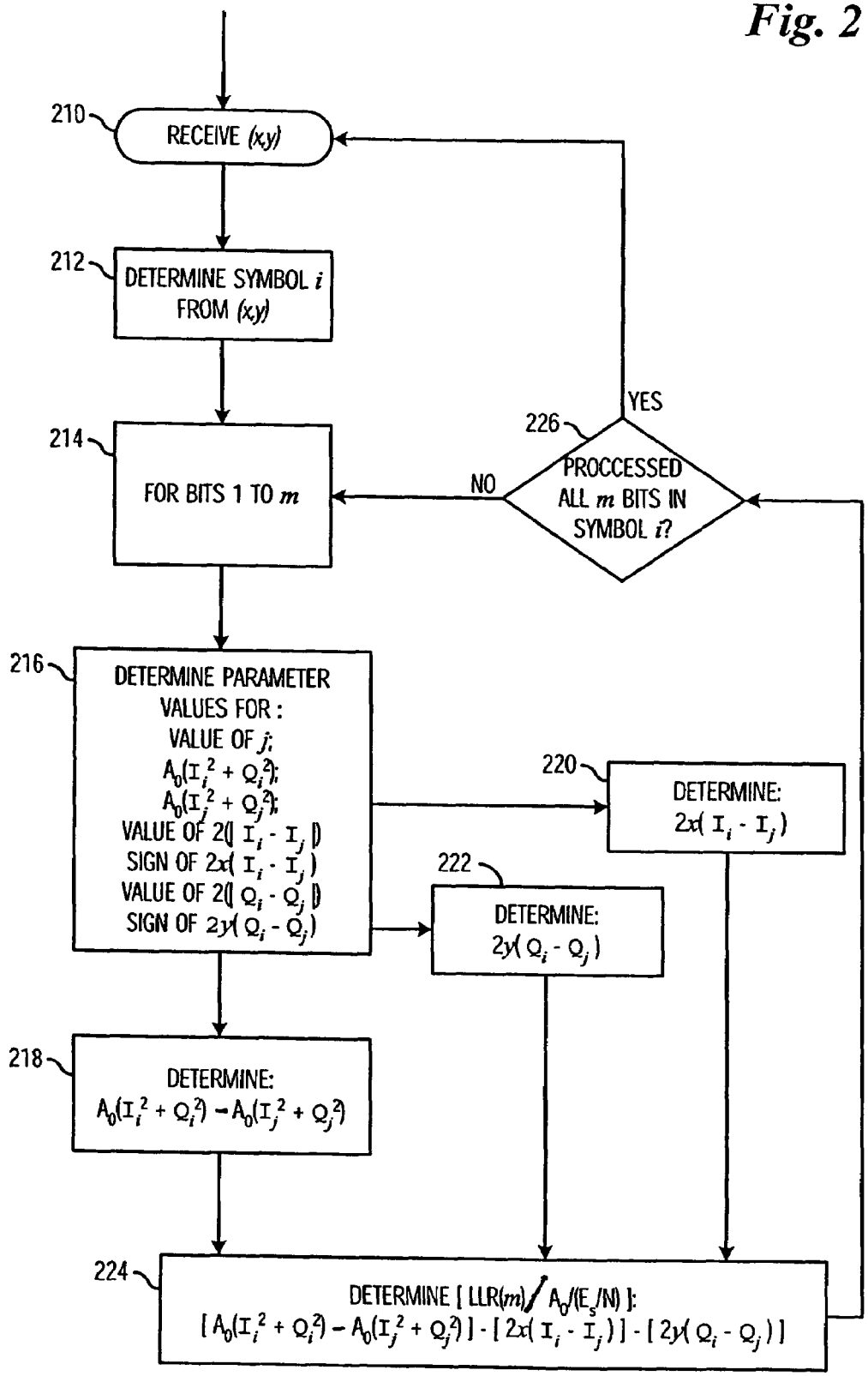
FIG. 2 is a flow chart illustrating control logic for a demodulator to determine the log-likelihood ratio.

FIG. 2 illustrates one embodiment of the present invention in which the LLR may be determined by, for example, the demodulator 134 (FIG. 1). As a preliminary matter, however, it should be noted that the LLR is generally accepted in the industry as being represented by the following equation:

$$LLR(m) \approx \frac{E_s}{N}[\min(d_i^2 \mid m=1) - \min(d_j^2 \mid m=0)] \quad \text{(Eq. 1)}$$

where:

m represents the $m^{th}$ bit of the received symbol;

$d_i^2$ represents the distance between the received symbol and the $i^{th}$ symbol of the constellation;

$\min(d_i^2 \mid m=1)$ represents the distance to the $i^{th}$ symbol where the $i^{th}$ symbol is the closest symbol to the (x,y) coordinates;

$d_j^2$ represents the distance between the received symbol and the $j^{th}$ symbol of the constellation, the $j^{th}$ symbol being the symbol whose $m^{th}$ bit is opposite of the $m^{th}$ bit of the $j^{th}$ symbol;

$\min(d_j^2 \mid m=0)$ represents the distance to the $j^{th}$ symbol where the $j^{th}$ symbol is the closest to the (x,y) coordinates; and $E_s/N$ represents the signal-to-noise ratio.

Furthermore, it is widely accepted that the distance $d_1^2$, and similarly, the distanced $d_j^2$, may be represented by the following equation:

$$d_1^2 = (x-\hat{I}_1)^2 + (y-Q_1)^2 = x^2 + y^2 + \hat{I}_1^2 + Q_1^2 - 2x\hat{I}_1 - 2yQ_1 \quad \text{(Eq. 2)}$$

where:

$\hat{I}_1$ and $Q_1$ represent the I and Q component of the $i^{th}$ symbol; and x and y represent the received I and Q components, respectively.

Therefore, by noting that for any one (x,y) coordinate, Eq. 2 may be substituted into Eq. 1 to derive the following equation:

$$LLR(m) = \frac{E_s}{N}[(\hat{I}_i^2 + \hat{Q}_i^2) - (\hat{I}_j^2 + \hat{Q}_j^2) - 2x(\hat{I}_i - \hat{I}_j) - 2y(\hat{Q}_i - \hat{Q}_j)] \quad \text{(Eq. 3)}$$

By using the minimum amplitude, $A_0$ to normalize I and Q, the equation becomes:

$$LLR(m) = \frac{E_s}{N} A_0 [A_0(\hat{I}_i^2 + \hat{Q}_i^2) - A_0(\hat{I}_j^2 + \hat{Q}_j^2)] - \frac{E_s}{N} A_0 [2x(\hat{I}_i - \hat{I}_j) - 2y(\hat{Q}_i - \hat{Q}_j)] \quad \text{(Eq. 4)}$$

Finally, the term $(E_s/N)A_0$ may be accounted for in the turbo decoder by a scaling factor. Preferably, however, the turbo decoder is based on the Max-log-MAP algorithm, which has a factor to cancel the $(E_s/N)A_0$ term. Therefore, Eq. 4 becomes:

$$LLR(m) / \frac{E_s}{N} A_0 = [A_0(\hat{I}_i^2 + \hat{Q}_i^2) - A_0(\hat{I}_j^2 + \hat{Q}_j^2)] - [2x(\hat{I}_i - \hat{I}_j)] + [2y(\hat{Q}_i - \hat{Q}_j)] \quad \text{(Eq. 5)}$$

As will be appreciated by one skilled in the art, given the value of i, the value of j is constant and, therefore, the value within the first bracket is constant given i and j. The values of the second and third brackets may be determined efficiently.

Referring now back to FIG. 2, the preferred embodiment for implementing the equation derived in Eq. 5, the LLR input to the turbo decoder 136, i.e., $LLR(m)/((E_s/N)*A_0)$, is determined. Processing begins in step 210, wherein the (x,y) coordinates are received. As is known in the art, the demodulator 134 generates an (x,y) coordinate representing the received (I,Q) coordinate, where I represents the in-phase component (i.e., the cosine) and Q represents the quadrature component (i.e., the sine) of the received energy vector. The (x,y) coordinates are then utilized in determining the received symbol and the LLR 138. The process of generating the (x,y) coordinates is considered well known in the art and, therefore, will not be discussed in greater detail.

Processing then proceeds to step 212, wherein the symbol i is determined from the (x,y) coordinates, the symbol i being the symbol closest to the (x,y) coordinate. Preferably, the symbol i is determined by comparing the values of x and y with the symbol boundaries, as will be discussed in greater detail with reference to FIG. 3.

Given the symbol i, processing proceeds to steps 214–226, wherein a loop is performed for each bit in the symbol i. In step 216, several parameters are determined in preparation of calculating Eq. 5. Namely, the value of j, which is the symbol closest to coordinates (x,y) that has a bit value opposite of the corresponding bit value of the $i^{th}$ symbol, the value of $A_0(\hat{I}_i^2 + Q_i^2)$, the value of $A_0(\hat{I}_j^2 + Q_j^2)$, the value of $2|\hat{I}_i - \hat{I}_j|$, the sign of $2x(\hat{I}_i - \hat{I}_j)$, the value of $2|Q_i - Q_j|$, and the sign of $2y(Q_i - Q_j)$. The preferable implementation comprises a memory, such as Read-Only Memory (ROM), Random Access Memory (RAM), and the like, that contains the values stated above and that is indexed by i. Alternatively, the above values may be calculated. The following table specifies the possible values for the left-most bit of the symbol i for implementing the 16-QAM 1Xtreme standard proposed by Motorola, and is provided for exemplary purposes only, and as such, should not limit the present invention in any way.

| Index (i) | j | $A_0(\hat{I}_i^2 + \hat{Q}_i^2)$ | $-A_0(\hat{I}_j^2 + \hat{Q}_j^2)$ | $2|\hat{I}_i - \hat{I}_j|$ | Sign of $2x(\hat{I}_i - \hat{I}_j)$ (0 = −, 1 = +) | $2|\hat{Q}_i - \hat{Q}_j|$ | Sign of $2y(\hat{Q}_i - \hat{Q}_j)$ (0 = −, 1 = +) |
|---|---|---|---|---|---|---|---|
| 0 | 8 | 0.3163 | −3.163 | 0 | 1 | 2 | 1 |
| 1 | 9 | 0.3163 | −3.163 | 0 | 1 | 2 | 1 |
| 2 | 10 | 0.3163 | −3.163 | 0 | 1 | 2 | 0 |
| 3 | 11 | 0.3163 | −3.163 | 0 | 1 | 2 | 0 |
| 4 | 12 | 3.163 | −5.6934 | 0 | 1 | 2 | 1 |
| 5 | 13 | 3.163 | −5.6934 | 0 | 1 | 2 | 1 |
| 6 | 14 | 3.163 | −5.6934 | 0 | 1 | 2 | 0 |
| 7 | 15 | 3.163 | −5.6934 | 0 | 1 | 2 | 0 |
| 8 | 0 | 3.163 | −5.6934 | 0 | 1 | 2 | 1 |
| 9 | 1 | 3.163 | −5.6934 | 0 | 1 | 2 | 1 |
| 10 | 2 | 3.163 | −5.6934 | 0 | 1 | 2 | 0 |
| 11 | 3 | 3.163 | −5.6934 | 0 | 1 | 2 | 0 |
| 12 | 4 | 5.6934 | −3.163 | 0 | 1 | 2 | 1 |
| 13 | 5 | 5.6934 | −3.163 | 0 | 1 | 2 | 1 |
| 14 | 6 | 5.6934 | −3.163 | 0 | 1 | 2 | 0 |
| 15 | 7 | 5.6934 | −3.163 | 0 | 1 | 2 | 0 |

Similar tables may be constructed for the remaining bits of the symbol i and will be obvious to one skilled in the art upon a reading of the present disclosure.

After determining the parameter values specified in step 216 processing proceeds to steps 218, 220, and 222, preferably in parallel. In step 218, the value of the first bracket of Eq. 5, namely, $[A_0(\hat{I}_i^2+\hat{Q}_i^2)-A_0(\hat{I}_j^2+\hat{Q}_j^2)]$, is calculated by summing the respective values from the table disclosed above. Alternatively, the resultant sum, i.e., $[A_0(\hat{I}_i^2+\hat{Q}_i^2)-A_0(\hat{I}_j^2+\hat{Q}_j^2)]$, may be predetermined and stored in the table, in which case, step 218 is not necessary.

In step 220, the value of the term $(2x(\hat{I}_i-\hat{I}_j))$ is calculated. Preferably, the above table stores the value of $2|\hat{I}_i-\hat{I}_j|$ as a power of 2. For instance, if the value of $(2|\hat{I}_i-\hat{I}_j|)$ is eight, then the value stored in the $2|\hat{I}_i-\hat{I}_j|$ is three ($2^3=2*4=8$). The value of $2(|\hat{I}_i-\hat{I}_j|)$ is applied to the value of x, preferably via the use of a shift register by shifting x left the value of $2|\hat{I}_i-\hat{I}_j|$ bits. Alternatively, particularly in systems in which the possible range of values of $2|\hat{I}_i-\hat{I}_j|$ are not limited to a power of two, the respective value stored in the table may be an absolute value of $2|\hat{I}_i-\hat{I}_j|$, and the term $2x(\hat{I}_i-\hat{I}_j)$ is determined via the use of shift registers and adders. For instance, if the value of $2|\hat{I}_i-\hat{I}_j|$ is 6, then the value of $2x(\hat{I}_i-\hat{I}_j)$ may be determined via a shift left by 2 bits and an addition of the original value.

The sign is preferably corrected by applying the "Sign of $2x(\hat{I}_i-\hat{I}_j)$" parameter extracted from the above table. For instance, if the value in the respective "Sign of $2x(\hat{I}_i-\hat{I}_j)$" column is a "0," then the calculated value is set to a negative value, otherwise, the value is left positive. Furthermore, it is preferred that the "Sign of $2x(\hat{I}_i-\hat{I}_j)$" incorporate the sign of the calculated value and the sign of the term in Eq. 5.

In a similar manner, the value of $(2y(Q_i-Q_j))$ is determined in step 222.

After steps 218, 220, and 222, processing proceeds to step 224, wherein the value of $(LLR(m)/((E_s/N)*A_0))$ is determined by summing the results of steps 218, 220, and 222.

Processing then proceeds to step 226, wherein a determination is made whether all bits of the symbol i have been processed. If a determination is made that all m bits in the symbol i have not been processed, then processing proceeds to steps 214–224, wherein the next bit in symbol i is processed. If, however, a determination is made that all m bits in the symbol i have been processed, then processing proceeds to step 210, wherein a new (x,y) coordinate is received and steps 212–226 are repeated as described above.

Figure 3:
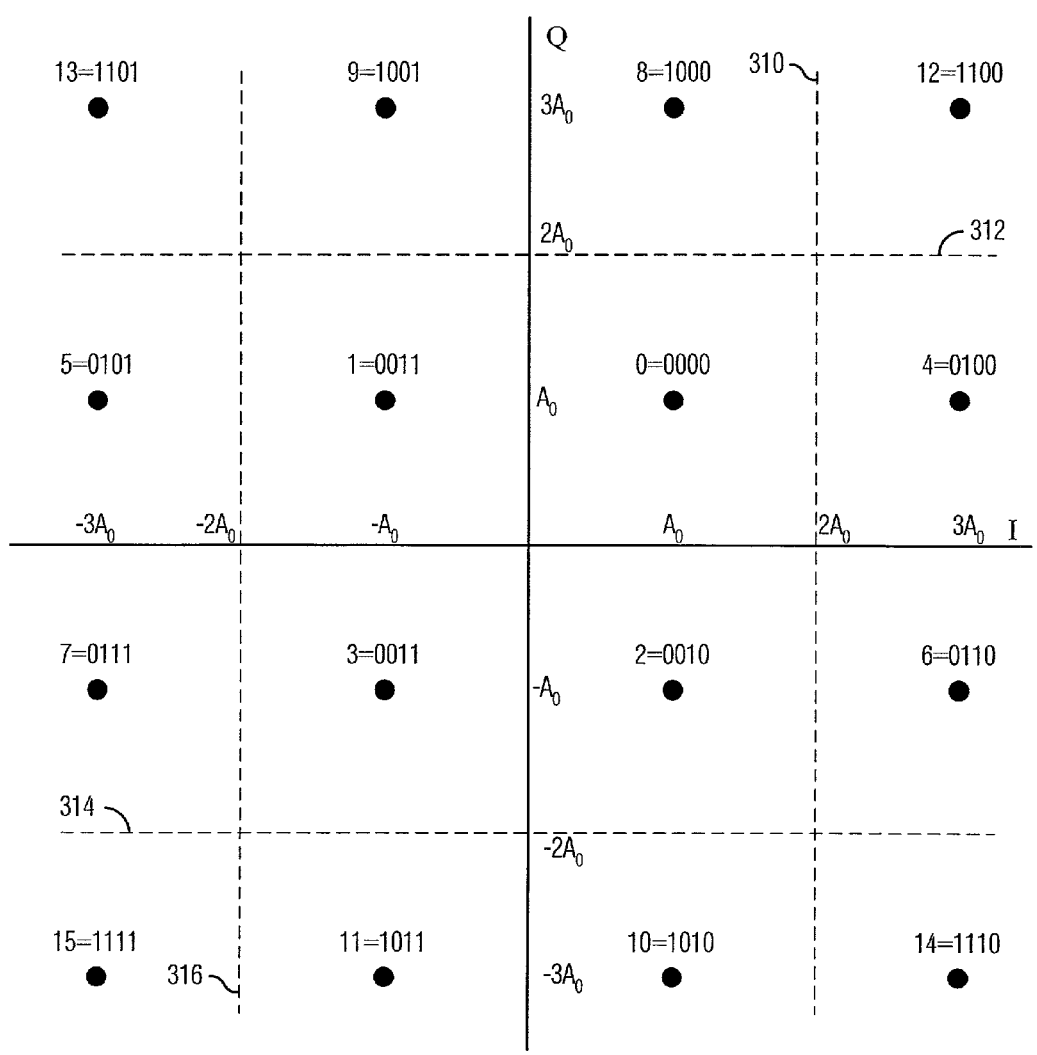
FIG. 3 is a constellation diagram for a 16-QAM system.

FIG. 3 illustrates a 16-QAM constellation diagram that embodies features of the present invention, and that conforms to the 1Xtreme standard proposed by Motorola. As can be seen, the constellation points are located at $-3A_0$, $-A_0$, $A_0$, and $3A_0$. The dotted lines 310, 312, 314, and 316, in addition to the I and Q axis, represent the boundaries $(-2A_0, 0, \text{and } 2A_0)$ between the various constellation points. For instance, if the (x,y) coordinate falls within the square formed by the I axis, the Q axis, the dotted line 310, and the dotted line 312, then the symbol i is equal to 0, the (I,Q) coordinate being (1,1) after normalization by $A_0$.

Furthermore, FIG. 3 illustrates the relationship between the symbol i and the symbol j. If the symbol i is the symbol 0, then the symbol j, which, as discussed above, is the symbol closest to the (x,y) coordinate that has a bit value opposite the corresponding bit value of symbol i, for the first bit, i.e., the left-most bit, is the symbol 8. Similarly, for the second bit, the symbol j is equal to 4.

Figure 4:
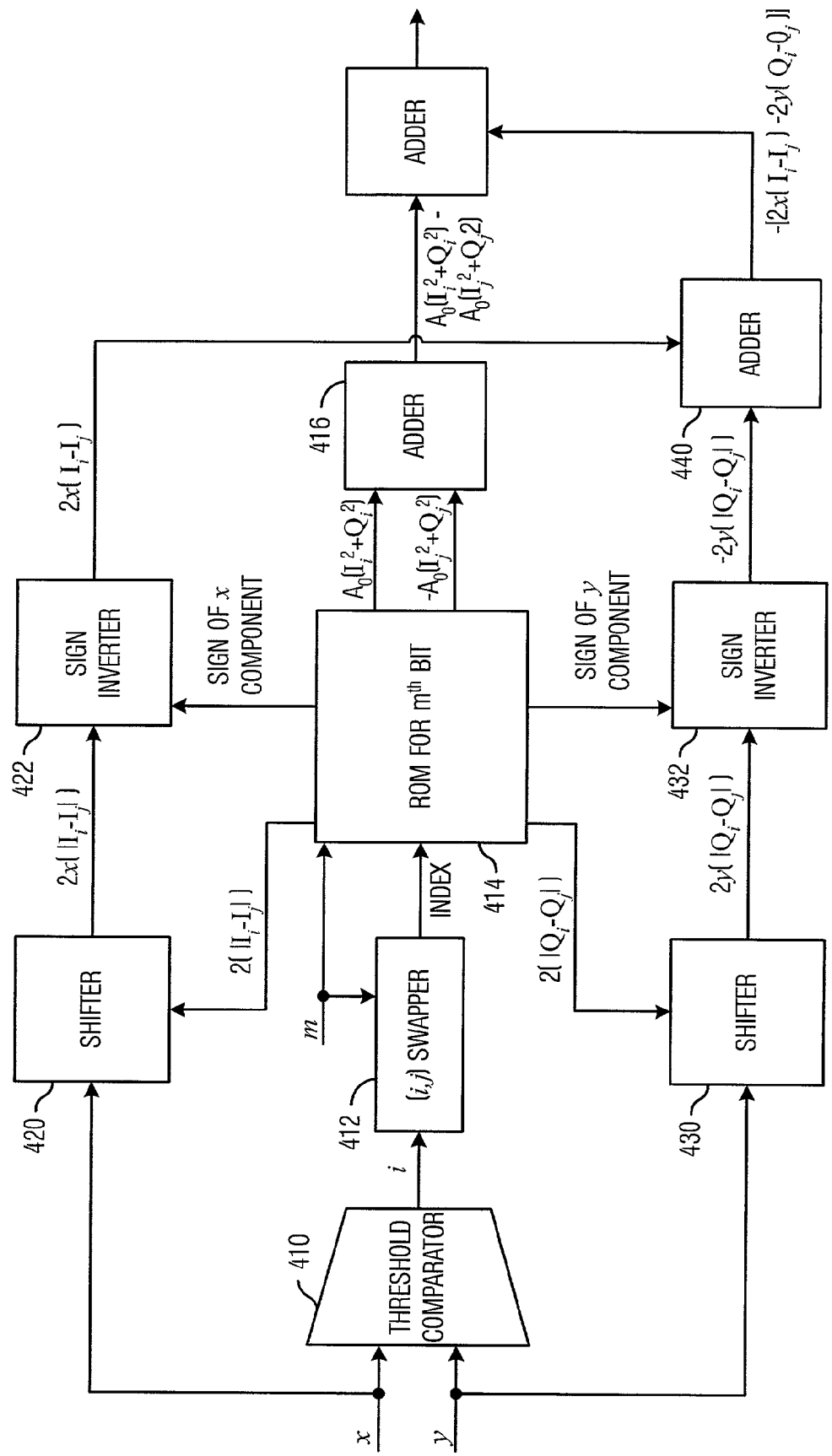
FIG. 4 is a block diagram illustrating one embodiment of the present invention in which the log-likelihood ratio is calculated.

FIG. 4 illustrates one embodiment for determining the value of $(LLR(m)/((E_s/N)*A_0))$ discussed above with reference to FIG. 2, in the context of a Very Large-Scale Integrated Circuit (VLSI) architecture. A threshold comparator 410 is configured to receive the (x,y) coordinates and compare the coordinates to the threshold limits discussed above with reference to FIG. 3, namely the $-2A_0$, 0, and $2A_0$ boundaries. The output of the threshold comparator is the symbol i corresponding to the symbol that is within the same boundaries as the (x,y) coordinate, i.e., the symbol i that is the closest to the (x,y) coordinate.

Optionally, an (i,j) swapper 412 is used to conserve memory. As one will appreciate from the table above, the values for the symbols 0–7 are symmetrical to the values for the symbols 8–15. If desired for a particular application, the (i,j) swapper may be used to conserve memory by storing only the values for the symbols 0–7. If the symbol i is 8–15, then the value of j, which is constant for each bit of each symbol i, is used as the index into the table and the values of the symbols swapped. Therefore, the (i,j) swapper 412 is coupled to the threshold comparator 410 to receive the symbol i and provide and index value, which may be either the symbol i or the symbol j. The (i,j) swapper 412 evaluates the first bit of the symbol i and swaps the value of the symbol i with the value of the symbol j if the first bit of symbol i is a "1," i.e., the value of symbol i is 8–15.

A memory, such as a ROM 414, is coupled to the (i,j) swapper 412 and is configured for storing the appropriate values as described above with reference to Table 1 and FIG. 2. The ROM 414 is also coupled to an adder 416 for receiving the values of the terms $A_0(\hat{I}_1^2+Q_i^2)$ and $-A_0(\hat{I}_j^2+Q_j^2)$ and calculating the sum thereof. Alternatively, as discussed above, the sum of the terms $A_0(\hat{I}_i^2+Q_i^2)$ and $-A_0(\hat{I}_j^2+Q_j^2)$ may be stored directly in the ROM 414, in which case, adder 416 is not necessary.

A shifter 420, e.g., a barrel shifter, is configured for receiving the value of the x component of the (x,y) coordinate and the value of $2(|\hat{I}_i-\hat{I}_j|)$ represented as a power of 2. The shifter 420 shifts the value of x left the number of bits specified by the value of the $2(|\hat{I}_i-\hat{I}_j|)$ entry in the ROM 414. A sign inverter 422 is coupled to the shifter 420 for receiving the result of the shifter 420 and inverting the sign as specified above with respect to the "Sign of $2x(\hat{I}_i-\hat{I}_j)$" entry in the ROM 414.

Similarly, a shifter 430 and a sign inverter 432 are used to determine the value of $2y(Q_1-Q_j)$.

An adder 440 is coupled to the sign inverter 422 and the sign inverter 432 and is configured for determining the sum of the $2x(\hat{I}_i-\hat{I}_j)$ and $2y(Q_i-Q_j)$.

An adder 450 calculates the final value of $(LLR(m)/((E_s/N)*A_0))$ as the sum of sum of $2x(\hat{I}_i-\hat{I}_j)$ and $2y(Q_i-Q_j)$ from the result of the adder 440, and the sum of $A_0(\hat{I}_i^2+Q_i^2)$ and $-A_0(\hat{I}_j^2+Q_j^2)$ from the result of the adder 416.

It is understood that the present invention can take many forms and embodiments. Accordingly, several variations may be made in the foregoing without departing from the spirit or the scope of the invention. For example, the present invention may be embodied in any wireless device, such as a wireless telephone, wireless computer, wireless PDA, or the like, in a component configured to connect to a wireless device, in a component configured as an element of a wireless device, or the like.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. An apparatus comprising:
   means for receiving an (x,y) coordinate of a modulated signal;
   means for determining a first value according to an equation $-2x(\hat{I}_i-\hat{I}_j)$, wherein $\hat{I}_i$ is an I component of a first symbol closest to the (x,y) coordinate and $\hat{I}_j$ is the I component of a second symbol closest to the (x,y) coordinate with a bit value opposite of the corresponding bit value of the first symbol;
   means for determining a second value according to an equation $2y(Q_i-Q_j)$, wherein $Q_i$ is Q component of the first symbol and $Q_j$ is the Q component of the second symbol;
   means for determining a third value equivalent to the sum of $A_0(\hat{I}_i^2+Q_i^2)$ and $-A_0(\hat{I}_j^2+Q_j^2)$, wherein $A_0$ is a minimum amplitude;
   means for determining a log-likelihood ratio (LLR) as a sum of the first value, the second value, and the third value; and
   means for transmitting the LLR to a decoder.

2. The apparatus of claim 1, further comprising means for storing the value of at least one of $2(|\hat{I}_i-\hat{I}_j|)$, $2(|Q_i-Q_j|)$, $A_0(\hat{I}_i^2+Q_i^2)$, $-A_0(\hat{I}_j^2+Q_j^2)$, the sign of $2x(\hat{I}_i-\hat{I}_j)$, and the sign of $2y(Q_i-Q_j)$ in memory.

3. The apparatus of claim 1, wherein the means for determining the first value comprises an adder and a sign inverter connected to the adder.

4. The apparatus of claim 1, wherein the means for determining the second value comprises an adder and a sign inverter connected to the adder.

5. An method for determining a log-likelihood ratio, the method comprising the steps of:
   receiving an (x,y) coordinate of a received signal;
   determining a first value according to an equation $-2x(\hat{I}_i-\hat{I}_j)$, wherein $\hat{I}_i$ is an I component of a first symbol closest to the (x,y) coordinate and $\hat{I}_j$ is the I component of a second symbol closest to the (x,y) coordinate with a bit value opposite of the corresponding bit value of the first symbol;
   determining a second value according to an equation $2y(Q_i-Q_j)$, wherein $Q_i$ is a Q component of the first symbol and $Q_j$ is the Q component of the second symbol;
   determining a third value equivalent to the sum of $A_0(\hat{I}_i^2+Q_i^2)$ and $-A_0(\hat{I}_j^2+Q_j^2)$, wherein $A_0$ is a minimum amplitude; and
   determining the log-likelihood ratio as the sum of the first value, the second value, and the third value.

6. An apparatus comprising:
   a receiver, which receives an (x,y) coordinate of a modulated signal;
   a demodulator, which is adapted to:
      determine a first value according to an equation $-2x(\hat{I}_i-\hat{I}_j)$, wherein $\hat{I}_i$ is an I component of a first symbol closest to the (x,y) coordinate and $\hat{I}_j$ is the I component of a second symbol closest to the (x,y) coordinate with a bit value opposite of the corresponding bit value of the first symbol; to determine a second value according to an equation $2y(Q_i-Q_j)$, wherein $Q_i$ is a Q component of the first symbol and $Q_j$ is the Q component of the second symbol; to determine a third value equivalent to the sum of $A_0(\hat{I}_i^2+Q_i^2)$ and $-A_0(\hat{I}_j^2+Q_j^2)$, wherein $A_0$ is a minimum amplitude; and to determine a log-likelihood ratio (LLR) as a sum of the first value, the second value, and the third value; and
   a decoder.

* * * * *